United States Patent
Ralston et al.

(10) Patent No.: US 8,706,104 B1
(45) Date of Patent: Apr. 22, 2014

(54) INTELLIGENT CELLULAR COMMUNICATIONS GATEWAY DEVICE, SYSTEM, AND METHOD

(75) Inventors: Robert E. Ralston, Eugene, OR (US); Justin D. Bloom, Eugene, OR (US)

(73) Assignee: Feeney Wireless, LLC, Eugene, OR (US)

( * ) Notice: Subject to any disclaimer, the term of this patent is extended or adjusted under 35 U.S.C. 154(b) by 86 days.

(21) Appl. No.: 13/546,501

(22) Filed: Jul. 11, 2012

Related U.S. Application Data

(60) Provisional application No. 61/512,355, filed on Jul. 27, 2011.

(51) Int. Cl.
*H04M 3/00* (2006.01)

(52) U.S. Cl.
USPC ........... 455/419; 455/418; 455/420; 455/352; 455/353; 455/556.1; 455/557; 370/328; 370/343

(58) Field of Classification Search
USPC ......... 455/418, 419, 420, 557, 352, 353, 556; 370/328, 343
See application file for complete search history.

(56) References Cited

U.S. PATENT DOCUMENTS

| | | | |
|---|---|---|---|
| 6,924,727 B2 * | 8/2005 | Nagaoka et al. | 340/3.1 |
| 7,869,824 B2 * | 1/2011 | Min | 455/550.1 |
| 7,895,257 B2 * | 2/2011 | Helal et al. | 709/201 |
| 8,577,392 B1 * | 11/2013 | Pai et al. | 455/456.3 |
| 2006/0099971 A1 * | 5/2006 | Staton et al. | 455/456.6 |
| 2008/0181172 A1 * | 7/2008 | Angelhag et al. | 370/328 |
| 2009/0204265 A1 * | 8/2009 | Hackett | 700/284 |
| 2009/0240392 A1 * | 9/2009 | Yamashita et al. | 701/33 |
| 2011/0261718 A1 * | 10/2011 | Dahlstedt et al. | 370/252 |

* cited by examiner

*Primary Examiner* — Liton Miah
(74) *Attorney, Agent, or Firm* — David A. Crowther

(57) ABSTRACT

A device, system, and method include receiving via a first network, by a remote computer server, a customized application from a user. The customized application is transmitted, by the remote computer server, to one or more intelligent cellular communications gateway devices. The customized application can be automatically installed and configured. Each intelligent cellular communications gateway device can receive local information from a device. The local information is analyzed and the local device can be controlled by the intelligent cellular communications gateway device based on the analyzed local information. In addition, the intelligent cellular communications gateway device can filter and/or compress the local information, and transmit via a cellular network, the filtered and compressed information, to the remote computer server. The filtered and compressed information includes a portion of the local information that is less than a total amount of the local information received, thereby conserving bandwidth of the cellular network.

17 Claims, 7 Drawing Sheets

INTELLIGENT CELLULAR COMMUNICATIONS GATEWAY DEVICE, SYSTEM, AND METHOD

CROSS-REFERENCES TO RELATED APPLICATIONS

This application claims the benefit of commonly assigned U.S. Provisional Application No. 61/512,355, filed Jul. 27, 2011, which is hereby incorporated by reference in its entirety.

FIELD OF THE INVENTION

This application pertains to communication devices, and more particularly, to an intelligent cellular communications gateway device, a system incorporating the device, and method for using the same.

BACKGROUND

Conventional cellular routers provide the ability to route information between local devices and remote devices via a cellular network. For example, owners of truck fleets may put cellular routers in each truck so that information can be transmitted between the trucks and a central server. Buildings may include cellular routers to transmit information about the buildings to a remote database or the like. Taxi-cabs or emergency vehicles may also have such routers to communicate information to and from a centralized network or server. These are but a few example systems in which cellular routers can be used.

The cost of transmitting data through a cellular router and/or via a cellular network is typically based on a per-megabyte bandwidth model. In other words, the cost to operate a cellular router is directly proportional to the amount of data transmitted via the cellular network. Even if some of the data being transmitted is superfluous, or otherwise not pertinent or useful, the cost for operating the cellular router will be higher because all of the data that is transmitted is counted relative to the cost of operation. Traditional cellular routers do not discern the type or quality of data being transmitted, nor do they filter or omit unnecessary data. Moreover, as the sheer quantity of information transmitted over cellular networks increases, network bottlenecks and inefficiencies are increasingly common.

Accordingly, a need remains for an intelligent cellular communications gateway, which includes intelligence "at the edge" for controlling local devices, and for filtering, consolidating, and/or compressing data so that bandwidth usage can be reduced, network efficiency improved, and cost savings realized. In addition, needs remain for providing the ability to remotely and automatically install and execute applications and configurations on multiple cellular communications gateways.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first network interface could be termed a second network interface, and, similarly, a second network interface could be termed a first network interface, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present invention provide the capability of embedding customer applications and/or business logic into an intelligent cellular communications gateway. Although referred to herein as a "gateway," it should be understood that this term can include a router, programmable logic controller (PLC), or the like. Methods and devices for expanding the functionality of a traditional gateway are disclosed herein, which allow the gateway to perform additional tasks at the discretion of the end user.

Figure 1:
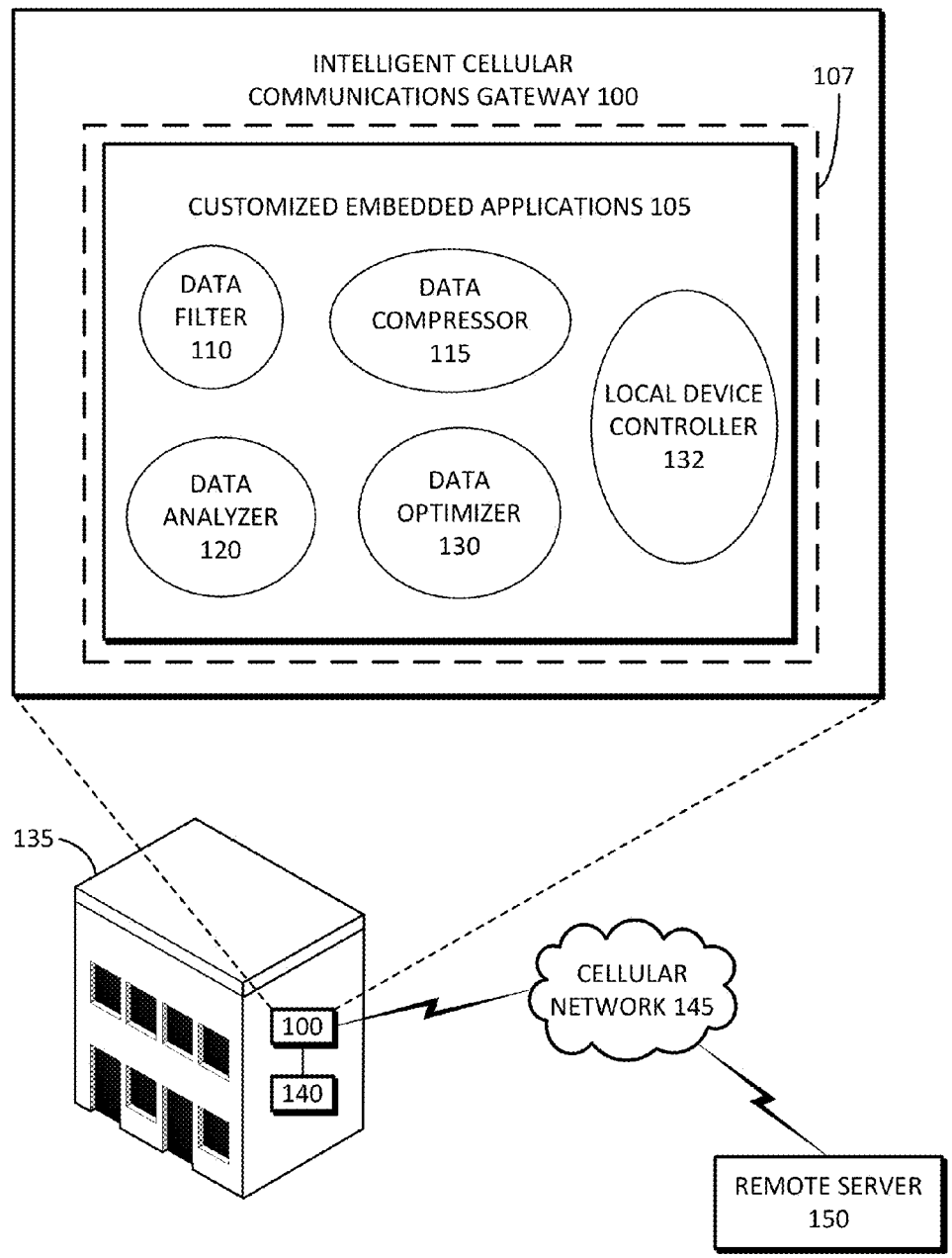
FIG. 1 shows a block diagram of an example embodiment of an intelligent cellular communications gateway device within a larger system in accordance with various inventive concepts of the present invention.

FIG. 1 shows a block diagram of an example embodiment of an intelligent cellular communications gateway device 100 within a larger system in accordance with various inventive concepts of the present invention. The cellular gateway 100 provides the capability to remotely load, store, update, and execute customized embedded applications, scripts, and/or business logic (e.g., 105) at the discretion of the end user. By providing "intelligence at the edge," the cellular gateway 100 can analyze, filter, and/or compress data before transmitting the data via a cellular network. In this manner, extraneous usage can be reduced. Since the cost of bandwidth usage over a cellular network is typically based on a per-size-unit (e.g., per-megabyte) basis, cost savings are realized by filtering redundant data transmissions. Furthermore, a scripting language can be used to allow business logic to be installed onto the cellular gateway 100 without the need to compile a binary (i.e., executable) file. For the sake of brevity and consistency, the customized remotely loadable embedded applications, scripts, and/or business logic 105 are generally referred to herein as simply customized or embedded applications.

For example, an application such as the data analyzer 120, the data filter 110, the data compressor 115, the data optimizer 130, and/or the local device controller 132, can be embedded into the intelligent cellular communications gateway device 100. One or more of these embedded applications can provide, for instance, the capability to monitor and/or control devices or environments that are local relative to the gateway device 100. The term "local" can mean, for example, within a same building as the intelligent cellular communications gateway device, or alternatively, within a given local radius or area relative to the intelligent cellular communications gateway device 100 (e.g., within a 1 mile local radius of the device 100, a 0.5 mile local radius of the device 100, a 0.1 mile local radius of the device, and so forth).

The gateway 100 can control a local device 140 using the local device controller 132 embedded application. For example, the local device 140 can be a furnace or air-conditioning unit, and the local device controller 132 of the intelligent cellular gateway device 100 can control the power levels or other settings to the furnace or air-conditioning unit 140. Furthermore, the gateway device 100 can receive local temperature information from the furnace or air-conditioning unit, and in response to the local information, monitor and/or control the temperature within a building 135. For example, if the temperature crosses a predefined threshold, the intelligent cellular gateway device 100 can adjust one or more settings of the furnace or air-conditioning unit. In addition, a message can be sent via a cellular network 145 to a remote server 150 to note that the heater or furnace was enabled or disabled, that the temperature is of a certain level, that the furnace or air-conditioning unit was recently adjusted operationally, or any other suitable information about the furnace and/or air-conditioning unit, or the associated environment.

Traditionally this type of functionality would have required at least two separate devices (in addition to the local device), such as a router and a programmable logic controller that had been preconfigured with the appropriate business logic and application. This complicates the management and operation because there are multiple separate devices having different configuration parameters, power connections, rack space, and so forth. Configuration of such disparate devices is challenging and inefficient. Moreover, if a conventional router is used in such a combination, it must transmit all of the temperature information each time the temperature is monitored, thereby increasing the costs of operating the cellular router.

Embodiments of the present invention address these and other limitations. For instance, the data analyzer 120 can analyze data prior to being transmitted via the cellular network 145. If the data analyzer 120 determines that certain data is not useful or is otherwise superfluous information, or is information that ought not to be transmitted via the cellular network for any suitable reason, then such information is prevented from being transmitted via the cellular network, thereby reducing the amount of bandwidth consumed over the cellular link when transmitting data to a remote server. The data filter 110 can filter or omit any superfluous data. Alternatively, or in addition to, the data compressor 115 can compress the data to improve the efficiency of the transmission.

In addition, the data optimizer 130 can reorganize, prioritize, or otherwise optimize the data for more efficient transmission. For example, higher priority portions of the data can always be transmitted over the cellular network, while lower priority portions of the data can be closely discriminated against, and transmitted only if other conditions are met such as a low total cellular bandwidth consumption. Moreover, the local device controller 132 can control one or more local devices. Multiple applications can be embedded such that each task is performed by a separate application. In some embodiments, a single embedded application analyzes, filters, compresses, and/or optimizes the data prior to transmission via the cellular network. Accordingly, cellular bandwidth is conserved.

It will be understood that while the example of a furnace system or air-conditioning unit is described herein, which includes remote reporting, remote control, and/or local control, or the like, via a cellular network using an intelligent gateway, such description is included as an example or illustrative embodiment. Other local devices (i.e., local relative to the cellular communications gateway device) that may be situated, for example, within buildings, oil fields, power grids, space ports, or the like, and which may be controlled locally by the intelligent gateway devices, while also providing reporting and/or control features, either locally or remotely via the cellular network, using one or more intelligent cellular communications gateway devices having customized embedded applications pushed onto the devices, also falls within the inventive concepts and scope of the various embodiments of the invention.

Figure 2:
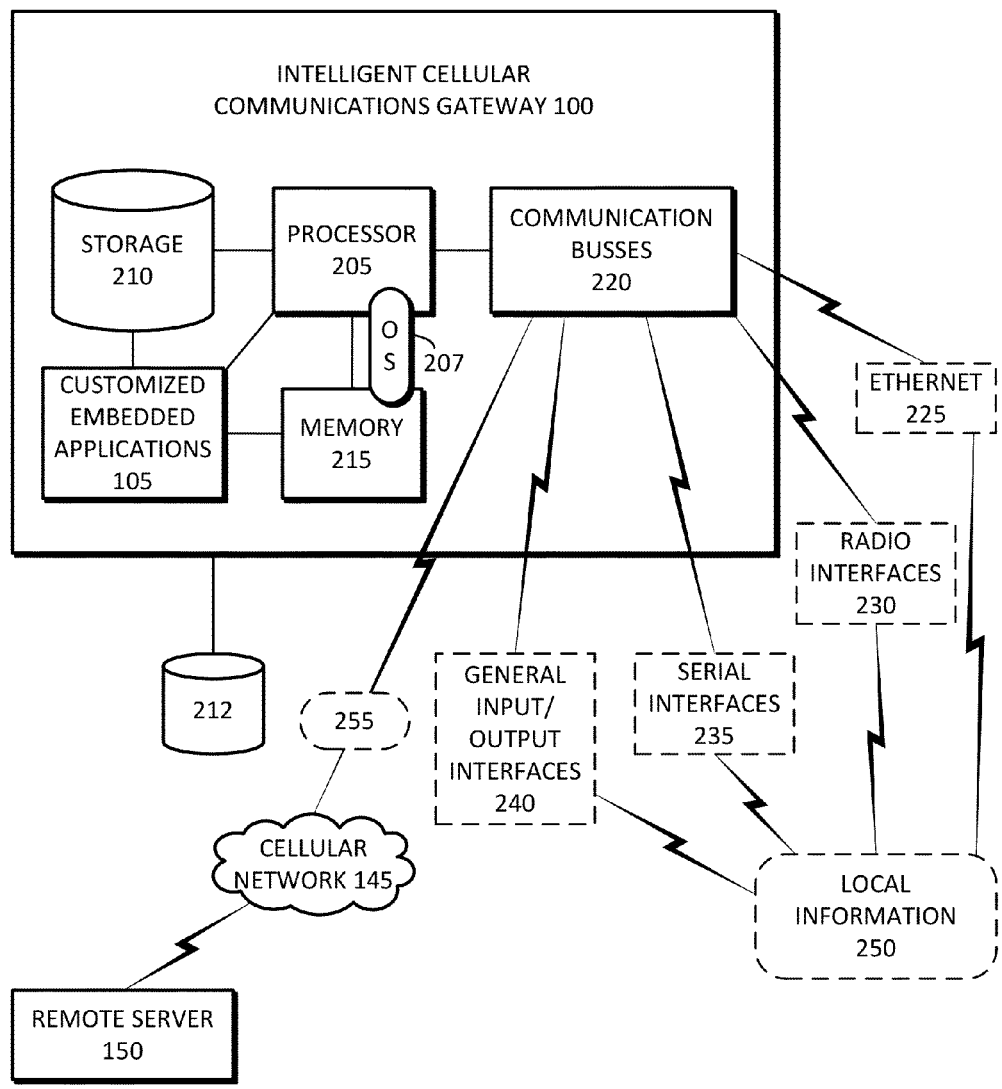
FIG. 2 shows a block diagram of another example embodiment of an intelligent cellular communications gateway device within a larger system including various operational components and communication interfaces.

FIG. 2 shows a block diagram of another example embodiment of an intelligent cellular communications gateway device 100 within a larger system including various operational components and communication interfaces.

The communications gateway 100 can include a processor 205, an internal storage device 210, memory 215, and communication busses 220 to support connectivity to peripheral devices or interfaces. In addition, the communications gateway can include the customized embedded applications 105. The communications gateway 100 may also include externally attached storage 212. The communications gateway device 100 may receive the customized embedded applications 105 using the externally attached storage 212. Any combination of wired or wireless (e.g., radio frequency) interfaces may also be embedded or externally tethered. For instance, one or more of the communication busses 220 can be coupled to one or more Ethernet interfaces 225, one or more serial interfaces 235, one or more radio interfaces 230, and/or one or more general purpose input/output interfaces 240. Local information 250 can be collected locally using the interfaces 225, 230, 235, and/or 240, then processed by the embedded applications (e.g., 110, 115, 120, 130, and/or 132 of the customized embedded applications 105). Once analyzed and filtered, a portion 255 of the locally gathered information 250 can be transmitted to a remote server 150 or database via a cellular network 145. In other words, less than the total gathered local information 250 can be transmitted to the remote server 150 or database, thereby conserving cellular bandwidth, and therefore reducing the overall cost of operating the system. Over time, different filtered portions (e.g., 255) of the locally gathered information 250 can be periodically transmitted to the remote server 150 via the cellular network 145, while preventing the transfer of all of the locally gathered information 250, thereby reducing bandwidth on the cellular network 145 and the cost of operating the system. In addition, the embedded applications can use the local information 250 to determine when and how to control other devices (e.g., a building furnace or oil field equipment, etc.) in the general vicinity of the cellular gateway.

The cellular gateway 100 can include an embedded operating system capable of scheduling execution of embedded applications, software, firmware, or the like, as well as customized applications and/or business logic installed on the gateway. Embedded applications can be stored on the gateway device 100 using internal storage 210 (e.g., flash memory, magnetic hard drive, or other suitable memory or storage device, etc.) or via a tethered storage device 212 (e.g., compact flash, USB flash drive, SD Card, or other suitable memory or storage device, etc.).

Applications running on the communications gateway device are run within a protected framework (e.g., 107 of FIG. 1), providing controls upon the processor 205, the internal storage 210, and memory usage of the memory 215. The gateway operating system 207 has the ability to dynamically control resource allocation to running the embedded applications, scripts, and/or business logic 105 based upon multiple factors, including system load, the local information 250 received at the external inputs (e.g., 225, 230, 235, and/or 240), and/or remote control via the server 150.

Figure 3A:
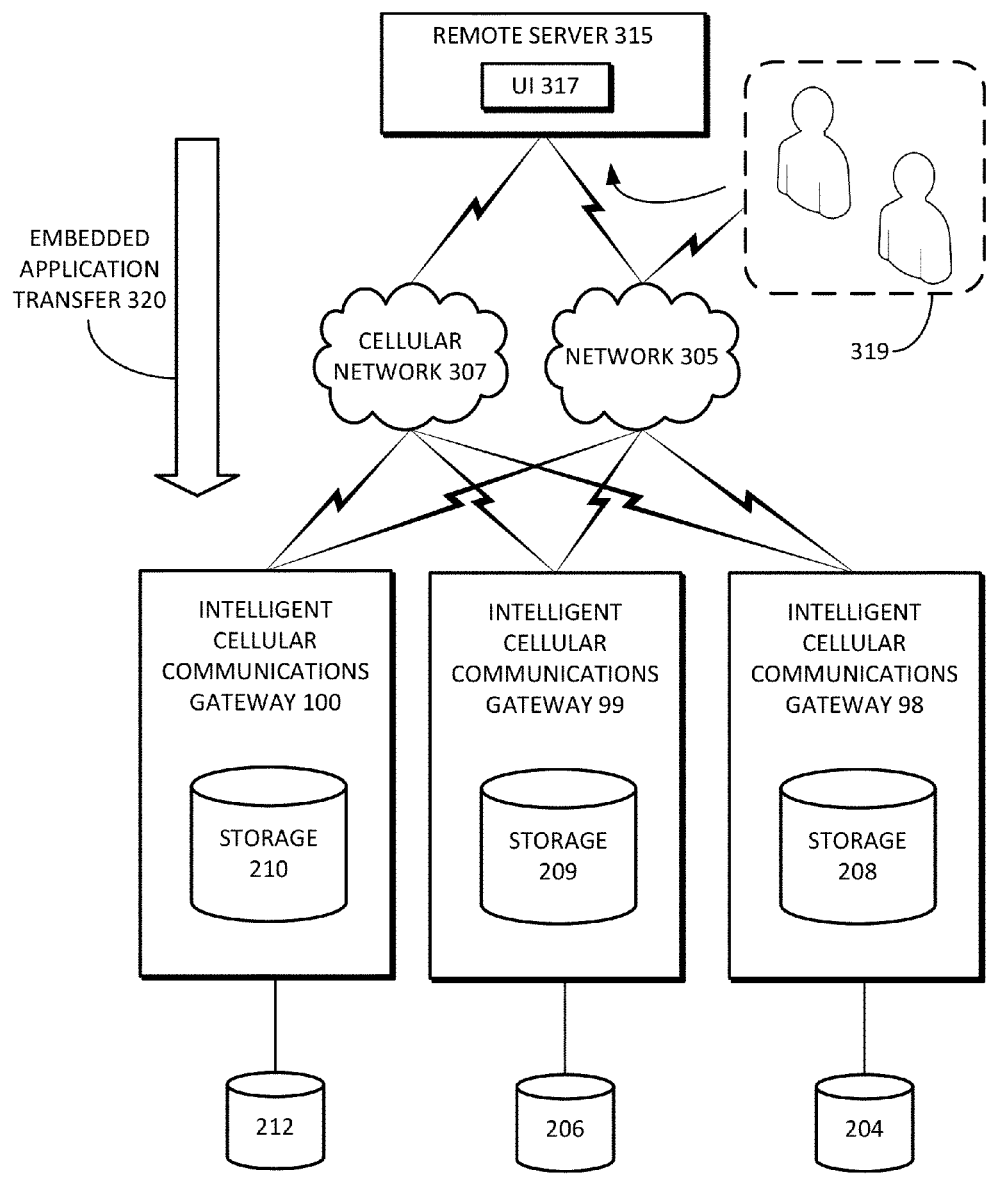
FIG. 3A shows a diagram of an example embodiment of one or more intelligent cellular communications gateway devices receiving an automatic application transfer from a server.

FIG. 3A shows a diagram of an example embodiment of one or more intelligent cellular communications gateway devices (e.g., 100, 99, and 98) receiving an automatic application transfer 320 from a remote server 315. The customized applications, scripts, and/or business logic can be automatically transferred to and installed by the operating system 207 on the cellular gateway 100 via the use of one or more servers 315 designed for this purpose. Moreover, the customized applications, scripts, and/or business logic can be transferred or substantially simultaneously broadcast to multiple cellular gateways (e.g., 100, 99, and 98, etc.). The remote server 315 provides a user interface 317, or in other words a single access point, to allow an end user 319 to manage and load applications on their gateway devices. The customized applications may also be substantially simultaneously installed and/or configured by each operating system on the multiple cellular gateways.

The end user need not log directly into any of the cellular gateway(s) to install or configure the application. Rather, the end user conveniently interfaces with the centralized user interface 317 provided by the server 315. For example, the end user can upload an executable to the server 315, and the server 315 can communicate with the cellular gateways (e.g., 100, 99, and/or 98) via a network 305 (e.g., the Internet), and cause the customized executable to be automatically transferred (e.g., at 320), installed, and/or configured on the cellular gateway(s) via either the same network 305, or alternatively, via a different network 307 (e.g., such as a cellular network). The customized application can be stored on the embedded storage device (e.g., 210, 209, and 208, respectively) and/or the externally attached storage device (e.g., 212, 206, and 204, respectively).

Moreover, it is often the case that multiple cellular gateways are owned by or otherwise associated with a single entity or individual. This is common in networked "smart" buildings, truck fleets, oil or gas fields, emergency medical fleets, law enforcement vehicles, taxi cabs, and so forth. In such case, the server 315 can receive the customized application from the end user, and can communicate with each of the multiple cellular gateways 100 via the network 305 (e.g., Internet) and/or the network 307 (e.g., cellular network), and cause the customized executable to be automatically transferred (e.g., at 320), installed, and/or configured on each of the multiple cellular gateways. Such automatic transferring, installing, and/or configuring can take place simultaneously relative to each of the cellular gateways. Alternatively, each of the multiple cellular gateways can be automatically configured (i.e., the application can be automatically transferred, installed, and/or configured on one cellular gateway, and then a similar procedure can be automatically carried out on another cellular gateway associated with the same owner or entity). In this fashion, the customized application is rapidly distributed to multiple cellular gateway devices.

Figure 3B:
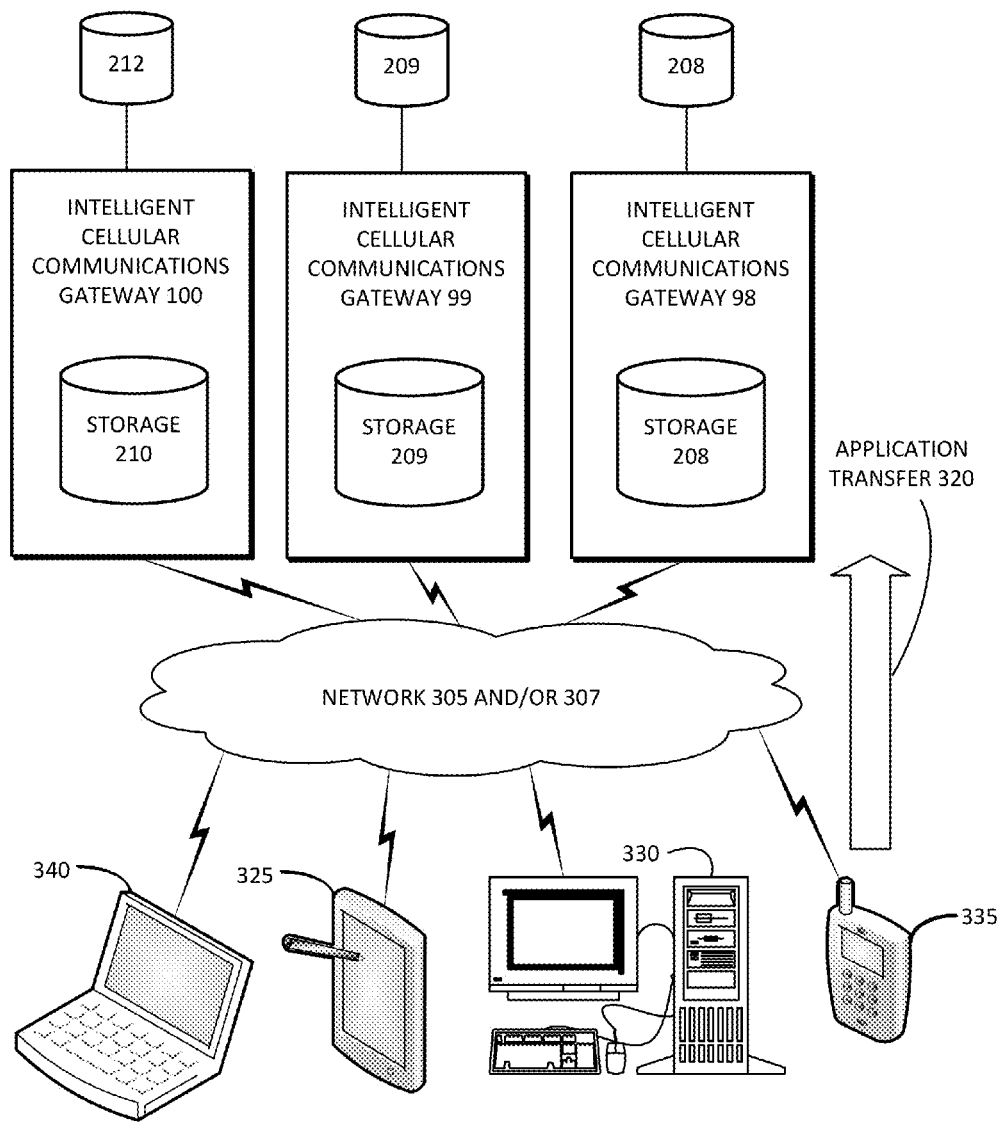
FIG. 3B shows a diagram of an example embodiment of one or more intelligent cellular communications gateway devices receiving an automatic application transfer from a personal computer or one of a variety of mobile smart devices.

FIG. 3B shows a diagram of an example embodiment of one or more intelligent cellular communications gateway devices (e.g., 100, 99, and 98, etc.) receiving an automatic application transfer 320 from a user device such as a personal computer 330 or one of a variety of mobile smart devices (e.g., laptop 340, tablet 325, and/or smart phone 335). The methods of transferring the customized applications from one or more of the personal computer 330, laptop 340, tablet 325, and smart phone 335 to the one or more intelligent cellular communication gateway devices (e.g., 100, 99, and 98, etc.) is similar to the methods described above with reference to FIG. 3A, and therefore for the sake of brevity, the detailed description of these methods is not repeated.

Figure 4:
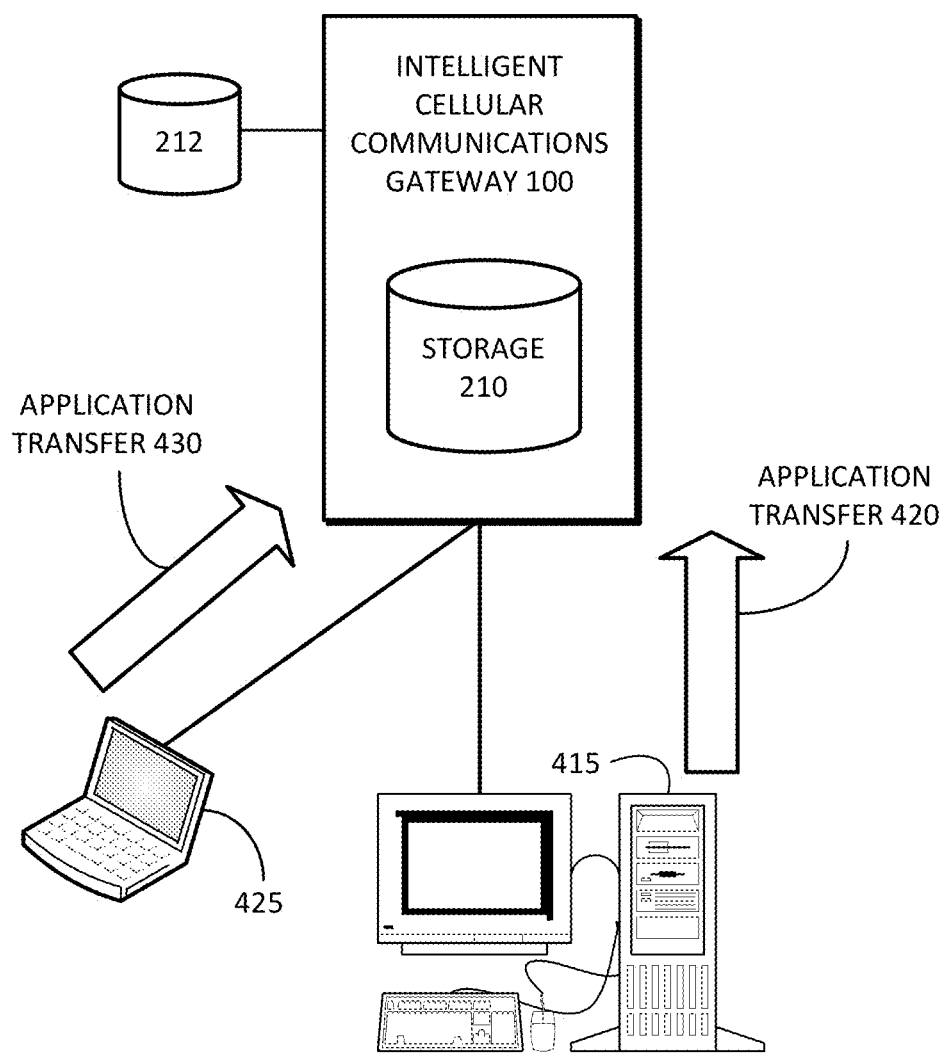
FIG. 4 shows a diagram of an example embodiment of an intelligent cellular communications gateway device receiving an automatic application transfer directly from a personal computer or laptop computer.

FIG. 4 shows a diagram of an example embodiment of an intelligent cellular communications gateway device 100 receiving an automatic application transfer (e.g., 420 and/or 430) directly from a personal computer (PC) 415 or laptop computer 425. The embedded applications can be loaded and managed on the gateway device 100 via a directly connected computing device (e.g., PC 415) running software designed for this purpose. In other words, a network need not be used to transfer the customized applications to the cellular gateway devices. Put differently, the user device can directly transmit, without the use of a network, the customized application to the one or more intelligent cellular communications gateway devices. The methods for transferring the customized applications are otherwise similar to those described above with reference to FIGS. 3A and 3B, and therefore for the sake of brevity, the detailed description of these methods is not repeated.

Figure 5:
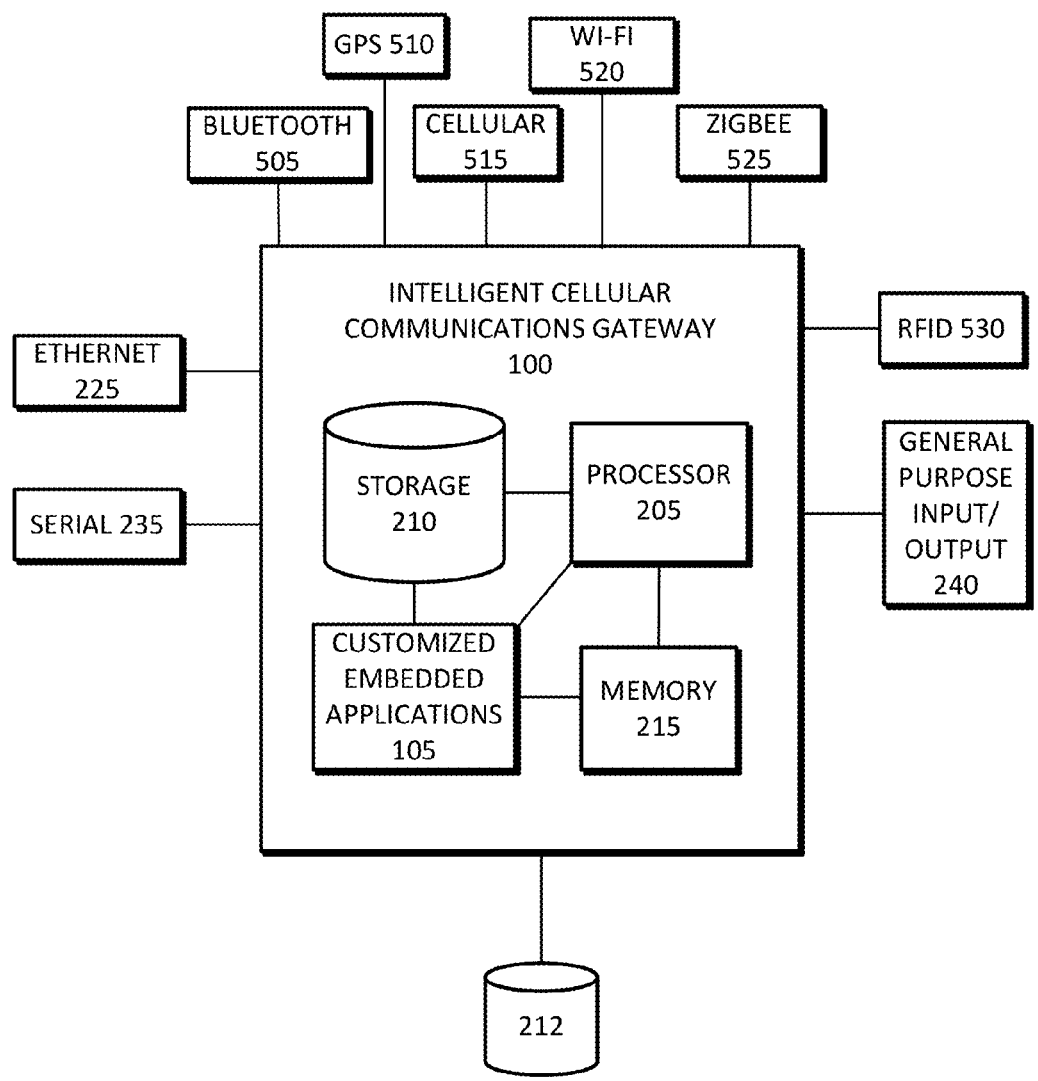
FIG. 5 shows a block diagram of another example embodiment of an intelligent cellular communications gateway device including additional communication interfaces.

FIG. 5 shows a block diagram of another example embodiment of an intelligent cellular communications gateway device 100 including additional communication interfaces. For instance, the cellular gateway 100 can include a Bluetooth® interface 505, a global positioning system (GPS) interface 510, a cellular network interface 515, a Wi-Fi™ interface 520, a Zigbee® interface 525, and/or a radio frequency identification (RFID) interface 530, among other suitable interfaces. One or more of such interfaces can be used to collect the local information 250 (of FIG. 250), which can be used by the embedded applications to control other devices in the vicinity of the cellular gateway, or to communicate information to the remote server.

Figure 6:
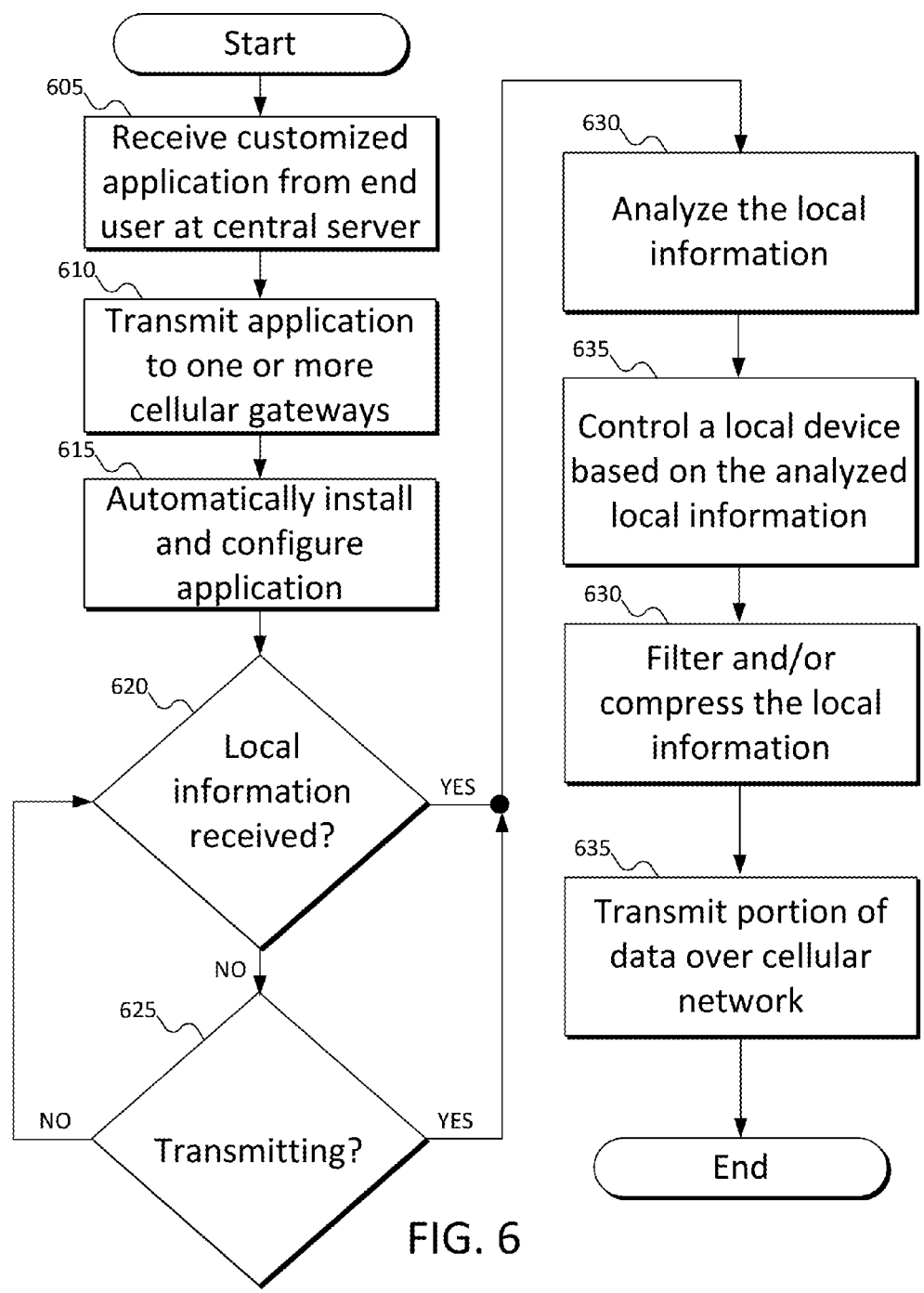
FIG. 6 shows a flow diagram of a technique for configuring a customized application on one or more intelligent cellular communications gateway devices, filtering and transmitting information via a cellular network.

FIG. 6 shows a flow diagram of a technique for configuring a customized application on one or more intelligent cellular communications gateway devices, filtering, and transmitting information via a cellular network.

The technique begins at 605 where a customized application is received from the end user at the central and/or remote server. The application can be received, for example, by the server 315 via a network such as the Internet. The application is then transmitted to one or more cellular communications gateway devices at 610. At 615, the application is automatically installed and configured on the one or more gateway devices, as described in detail above. In operation, a determination is made at 620 whether local information has been received at the cellular gateway 100 through one or more local communication interfaces. If YES, the flow proceeds to 630, and the local information is analyzed. At 632, a local device is controlled based on the analyzed local information using the customized embedded application(s). At 634, the local information is filtered, compressed, or otherwise optimized using the customized embedded application(s). Subsequently, only a portion of the local information (e.g., filtered data) is transmitted via the cellular network at 635 so that cellular bandwidth is conserved.

Otherwise, if the determination at 620 is NO, or in other words, no additional local information has been received, another determination is made at 625 whether data is currently being transmitted via the cellular network. If YES, the flow proceeds to steps 630, 632, 634, and 635 discussed above. Otherwise, the flow returns to 620 and additional local information is gathered for further processing.

The end user or owner of the intelligent cellular communications gateway device can purchase and cause to be installed applications that have been approved by the provider of the gateway device, so that the end user can customize their gateway device to their liking. By doing so the end user has created a unique software image on their gateway device without the direct interaction of the device manufacturer, although within known operating characteristics of the approved application.

This capability is useful, for example, in machine to machine (M2M) applications. This allows the communications gateway to perform tasks such as data analysis and filtering locally on board the gateway. We are terming this "intelligence at the edge." In addition, this capability allows software, such as device drivers, to be remotely installed and configured to add support for additional device peripherals, which can be connected to the gateway platform. Peripheral interface options may include, but are not limited to, serial (asynchronous and synchronous), Ethernet, cellular, universal serial bus (USB), Wi-Fi™ (802.11), Zigbee® (802.16.3), radio frequency identification (RFID), vehicle diagnostics (OBD-II, CAN, JBUS, J-1708, J-1939), Bluetooth®, global positioning system (GPS), cameras, audio interfaces devices, and/or general purpose input/output (GPIO).

This gateway platform when equipped with an embedded or tethered cellular WAN (data) radio can act as a programmable logic controller (PLC). The capability to embed applications allows local data analysis and/or filtering to determine "useful" information to send to a remote server. Traditional cellular gateways or routers lack this filtering capability and thus send all collected data to a server for analysis. The conventional method is inefficient. Also, using embodiments of the invention, the amount of traffic sent to the server can be optimized. In some embodiments, the WAN connection is cellular, and this gives the end customer or user the ability to utilize a lower rate plan due to the reduced bandwidth requirements.

This application embedding capability also gives the ability to make control decisions based upon locally collected data.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for providing intelligence at the edge using one or more intelligent cellular communications gateway devices, the method comprising:
   receiving via a first network, by a remote computer server, a customized application from a user;
   transmitting, by the remote computer server, the customized application to the one or more intelligent cellular communications gateway devices;
   automatically installing the customized application;
   automatically configuring the customized application;
   receiving, by the one or more intelligent cellular communications gateway devices, local information from a device that is local relative to the one or more intelligent cellular communications gateway devices;
   analyzing, by the one or more intelligent cellular communications gateway devices, the local information;
   controlling, by the one or more intelligent cellular communications gateway devices, the device that is local relative to the one or more intelligent cellular communications gateway devices, based on the analyzed local information;
   filtering, by the one or more intelligent cellular communications gateway devices, the local information; and
   transmitting via a cellular network, by the one or more intelligent cellular communications gateway devices, the filtered local information, to the remote computer server, wherein the filtered local information includes a portion of the local information that is less than a total amount of the local information received, thereby conserving bandwidth of the cellular network;
   wherein:
   receiving the local information from the device that is local relative to the one or more intelligent cellular communications gateway devices further includes receiving, by the one or more intelligent cellular communications gateway devices, local temperature information from a furnace or air-conditioning unit within a same building in which the one or more intelligent cellular communications gateway devices is located;
   analyzing the local information further includes analyzing, by the one or more intelligent cellular communications gateway devices, the local temperature information;
   controlling the device that is local relative to the one or more intelligent cellular communications gateway devices further includes controlling, by the one or more intelligent cellular communications gateway devices, the furnace or air-conditioning unit based on the analyzed local temperature information;
   filtering the local information further includes filtering, by the one or more intelligent cellular communications gateway devices, the local temperature information; and
   transmitting the filtered local information further includes transmitting via the cellular network, by the one or more intelligent cellular communications gateway devices, the filtered local temperature information, wherein the filtered local temperature information includes a portion of the local temperature information that is less than a total amount of the local temperature information received, thereby conserving bandwidth of the cellular network.

2. The method of claim 1, wherein transmitting the customized application includes simultaneously transmitting, by the remote computer server, the customized application to a plurality of intelligent cellular communications gateway devices.

3. The method of claim 2, further comprising:
   simultaneously installing the customized application on the plurality of intelligent cellular communications gateway devices; and
   simultaneously configuring the customized application on the plurality of intelligent cellular communications gateway devices.

4. The method of claim 1, further comprising:
   compressing, by the one or more intelligent cellular communications gateway devices, the filtered local information; and
   transmitting via the cellular network, by the one or more intelligent cellular communications gateway devices, the filtered and compressed local information, to the remote computer server.

5. The method of claim 1, wherein receiving the local information from the device that is local relative to the one or more intelligent cellular communications gateway devices further includes:
   receiving, by at least one of a serial interface, a radio interface, and an Ethernet interface of the one or more intelligent cellular communications gateway devices, the local information.

6. The method of claim 1, further comprising:
   receiving, by a user device, the customized application from the user; and
   transmitting, by the user device, the customized application to the one or more intelligent cellular communications gateway devices.

7. An intelligent cellular communications gateway device, comprising:
   a processor;
   a cellular network interface coupled to the processor;
   one or more local input/output (I/O) interfaces coupled to the processor, the one or more local I/O interfaces being configured to receive local information from a local device that is local relative to the intelligent cellular communications gateway device; and
   one or more customized embedded applications operable by the processor, wherein the one or more customized embedded applications are configured to analyze the local information, to control the local device based on the analyzed local information, and to filter the local information, and
   wherein:
   the processor is configured to transmit a portion of the local information via the cellular interface that is less than a total amount of the local information received;

the local device includes at least one of a furnace or an air-conditioning unit;

the local information includes local temperature information from the at least one of the furnace or air-the conditioning unit;

the one or more customized embedded applications are configured to analyze the local temperature information;

the one or more customized embedded applications are configured to control the at least one of the furnace or the air-conditioning unit based on the analyzed local temperature information;

the one or more customized embedded applications are configured to filter the local temperature information;

the processor is configured to transmit the filtered local temperature information via the cellular interface; and the filtered local temperature information includes a portion of the local temperature information that is less than a total amount of the local temperature information, thereby conserving bandwidth of the cellular interface.

8. The intelligent cellular communications gateway device of claim 7, wherein the one or more customized embedded applications include:

a data analyzer configured to analyze the local information;

a local device controller configured to control the local device based on the analyzed local information;

a data filter configured to filter the local information; and a data compressor configured to compress the filtered local information, wherein the processor is configured to transmit the filtered and compressed local information via the cellular interface; and wherein the filtered and compressed local information is less than the total amount of the local information received.

9. The intelligent cellular communications gateway device of claim 7, further comprising:

an internal storage device coupled to the processor;

a memory coupled to the processor;

an operating system associated with the processor and the memory;

a plurality of communication busses configured to support connectivity to the cellular network interface and the one or more local I/O interfaces, wherein the one or more local I/O interfaces include at least one of an Ethernet interface, a radio interface, or a serial interface; and an externally attached storage device.

10. The intelligent cellular communications gateway device of claim 9, wherein the one or more local I/O interfaces include at least one of a radio frequency identification interface, a Zigbee interface, a Bluetooth interface, a global positioning satellite interface, and a WI-FI interface.

11. The intelligent cellular communications gateway device of claim 9, wherein:

the processor is configured to receive the one or more customized embedded applications via the externally attached storage device;

the operating system is configured to automatically install the one or more customized embedded applications; and the operating system is configured to automatically configure the one or more customized embedded applications.

12. The intelligent cellular communications gateway device of claim 7, wherein the processor is configured to:

receive the one or more customized embedded applications via the one or more local I/O interfaces;

automatically install the one or more customized embedded applications; and automatically configure the one or more customized embedded applications.

13. The intelligent cellular communications gateway device of claim 7, wherein the processor is configured to:

receive the one or more customized embedded applications via the cellular network interface;

automatically install the one or more customized embedded applications; and automatically configure the one or more customized embedded applications.

14. A system for providing intelligence at the edge using a plurality of cellular communications gateway devices, the system comprising:

a remote computer server configured to receive, via a first network, a customized application from a user; and a plurality of intelligent cellular communications gateway devices, each configured to receive the customized application from the remote computer server;

wherein each of the intelligent cellular communications gateway devices is coupled to a respective local device and is configured to receive respective local information from respective the local device;

wherein each of the plurality of intelligent cellular communications gateway devices includes:

a processor;

a cellular network interface coupled to the processor and to a cellular network;

one or more local input/output (I/O) interfaces coupled to the processor, the one or more local I/O interfaces being configured to receive the respective local information from the respective local device; and one or more customized embedded applications operable by the processor, wherein the one or more customized embedded applications are configured to analyze the respective local information, to control the respective local device based on the analyzed local information, and to filter the respective local information, and wherein the processor is configured to transmit a portion of the respective local information via the cellular interface and the cellular network to the remote computer server, wherein the portion is less than a total amount of the respective local information received, and wherein:

the respective local device includes at least one of a furnace or an air-conditioning unit;

the respective local information includes local temperature information from the at least one of the furnace or air-the conditioning unit;

the one or more customized embedded applications are configured to analyze the respective local temperature information;

the one or more customized embedded applications are configured to control the at least one of the furnace or the air-conditioning unit based on the analyzed local temperature information;

the one or more customized embedded applications are configured to filter the respective local temperature information;

the processor is configured to transmit the respective filtered local temperature information via the cellular interface; and the respective filtered local temperature information includes a portion of the respective local temperature information that is less than a total amount of the respective local temperature information, thereby conserving bandwidth of the cellular interface.

15. The system of claim 14, wherein the one or more embedded applications of each of the plurality of intelligent cellular communications gateway devices include:
- a data analyzer configured to analyze the respective local information;
- a local device controller configured to control the respective local device based on the analyzed local information;
- a data filter configured to filter the respective local information; and
- a data compressor configured to compress the filtered local information,
- wherein the processor is configured to transmit the filtered and compressed local information via the cellular interface and the cellular network to the remote computer server; and
- wherein the filtered and compressed local information is less than the total amount of the respective local information received.

16. The system of claim 14, wherein the processor of each of the plurality of intelligent cellular communications gateway devices is configured to:
- receive the one or more customized embedded applications via the one or more local I/O interfaces;
- automatically install the one or more customized embedded applications; and
- automatically configure the one or more customized embedded applications.

17. The system of claim 14, wherein the processor of each of the plurality of intelligent cellular communications gateway devices is configured to:
- receive the one or more customized embedded applications via the cellular network interface and the cellular network; and
- automatically install the one or more customized embedded applications; and
- automatically configure the one or more customized embedded applications.

* * * * *